United States Patent
Xiao et al.

(10) Patent No.: US 10,643,520 B2
(45) Date of Patent: May 5, 2020

(54) LOW POWER PIXEL CIRCUIT, AN ARRAY SUBSTRATE USING THE PIXEL CIRCUIT, A DISPLAY DEVICE CONSTRUCTED WITH THE ARRAY SUBSTRATE, AND A CONTROLLING METHOD THEREOF

(71) Applicant: BOE TECHNOLOGY GROUP CO., LTD., Beijing (CN)

(72) Inventors: Li Xiao, Beijing (CN); Dongni Liu, Beijing (CN); Xiaochuan Chen, Beijing (CN); Shengji Yang, Beijing (CN); Lei Wang, Beijing (CN); Pengcheng Lu, Beijing (CN); Jie Fu, Beijing (CN); Han Yue, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/752,938

(22) PCT Filed: Aug. 3, 2017

(86) PCT No.: PCT/CN2017/095768
§ 371 (c)(1),
(2) Date: Feb. 15, 2018

(87) PCT Pub. No.: WO2018/126670
PCT Pub. Date: Jul. 12, 2018

(65) Prior Publication Data
US 2019/0005868 A1    Jan. 3, 2019

(30) Foreign Application Priority Data
Jan. 3, 2017    (CN) .......................... 2017 1 0002588

(51) Int. Cl.
*G09G 3/30*    (2006.01)
*G09G 3/36*    (2006.01)
(Continued)

(52) U.S. Cl.
CPC ......... *G09G 3/2092* (2013.01); *G09G 3/3225* (2013.01); *G09G 3/3233* (2013.01);
(Continued)

(58) Field of Classification Search
CPC ......... G06F 3/12; G06F 3/14; G06G 2354/00; G09G 3/30–3291; G09G 2300/08–0895; G09G 3/3225–3258
See application file for complete search history.

(56) References Cited

U.S. PATENT DOCUMENTS

| 7,965,283 | B2 | 6/2011 | Umezaki |
| 8,405,650 | B2 | 3/2013 | Umezaki |

(Continued)

FOREIGN PATENT DOCUMENTS

| CN | 101167118 A | 4/2008 |
| CN | 101777302 A | 7/2010 |

(Continued)

OTHER PUBLICATIONS

First Office Action for Chinese Patent Application No. 201710002588.8 dated Feb. 1, 2018.

(Continued)

*Primary Examiner* — Sanghyuk Park
(74) *Attorney, Agent, or Firm* — Calfee, Halter & Griswold LLP (57) ABSTRACT

Embodiments of the present disclosure provide a pixel circuit, an array substrate, a display device and a controlling method thereof. The pixel circuit includes: a pixel display unit consisted of n sub-pixel display units, n≥3; and a data signal control unit coupled to the pixel display unit, n data lines for driving the pixel display unit and a control line. The data signal control unit is configured to, under a condition that a first control signal is input through the control line, couple the n sub-pixel display units to the n data lines for (Continued)

driving the n sub-pixel display units respectively; and when a second control signal is input through the control line, couple one of the n data lines for driving the pixel display unit to at least one of the n sub-pixel display units in the pixel display unit.

7 Claims, 5 Drawing Sheets

(51) Int. Cl.
    *G09G 3/20*     (2006.01)
    *G09G 3/3233*     (2016.01)
    *G09G 3/3225*     (2016.01)
    *G06F 3/01*     (2006.01)

(52) U.S. Cl.
CPC ........... *G09G 3/3648* (2013.01); *G06F 3/013* (2013.01); *G09G 2300/0804* (2013.01); *G09G 2300/0871* (2013.01); *G09G 2310/0213* (2013.01); *G09G 2310/0243* (2013.01); *G09G 2310/0262* (2013.01); *G09G 2330/021* (2013.01); *G09G 2340/0407* (2013.01); *G09G 2354/00* (2013.01)

(56) References Cited

U.S. PATENT DOCUMENTS

| | | | |
|---|---|---|---|
| 9,099,020 | B2 | 8/2015 | Umezaki |
| 9,177,518 | B2 | 11/2015 | Gondo |
| 9,524,685 | B2 | 12/2016 | Kim et al. |
| 2005/0259703 | A1* | 11/2005 | You ....................... G09G 3/3233 372/38.07 |
| 2008/0231556 | A1* | 9/2008 | Kretz ................... G09G 3/3233 345/76 |
| 2009/0021501 | A1 | 1/2009 | Umezaki |
| 2011/0096062 | A1 | 4/2011 | Gondo |
| 2011/0310084 | A1 | 12/2011 | Umezaki |
| 2012/0212521 | A1* | 8/2012 | Yamauchi ............ G09G 3/3659 345/690 |
| 2013/0249887 | A1 | 9/2013 | Umezaki |
| 2015/0035740 | A1 | 2/2015 | Gondo |
| 2015/0279296 | A1 | 10/2015 | Kim et al. |
| 2018/0068618 | A1* | 3/2018 | Lin ....................... G09G 3/3258 |

FOREIGN PATENT DOCUMENTS

| | | |
|---|---|---|
| CN | 102044229 A | 5/2011 |
| CN | 103366660 A | 10/2013 |
| CN | 103943082 A | 7/2014 |
| CN | 104464601 A | 3/2015 |
| CN | 106782398 A | 5/2017 |
| EP | 2315197 A2 | 4/2011 |
| EP | 2610852 A2 | 7/2013 |
| JP | 2007047350 A | 2/2007 |
| WO | 2006115291 A1 | 11/2006 |

OTHER PUBLICATIONS

Search Report for International Application No. PCT/CN2017/095768 dated Oct. 27, 2017.

* cited by examiner

LOW POWER PIXEL CIRCUIT, AN ARRAY SUBSTRATE USING THE PIXEL CIRCUIT, A DISPLAY DEVICE CONSTRUCTED WITH THE ARRAY SUBSTRATE, AND A CONTROLLING METHOD THEREOF

CROSS-REFERENCE TO RELATED APPLICATIONS

The present application is based upon International Application No. PCT/CN2017/095768, filed on Aug. 3, 2017, which is based upon and claims priority to Chinese Patent Application No. 201710002588.8, titled "PIXEL CIRCUIT, ARRAY SUBSTRATE, DISPLAY DEVICE AND CONTROLLING METHOD THEREOF" filed on Jan. 3, 2017, the entire contents of which are incorporated herein by reference.

TECHNICAL FIELD

The present disclosure relates to a field of display technology, and in particular, to a pixel circuit, an array substrate, a display device and a controlling method thereof.

BACKGROUND

With the quick development of science and technology, various display devices have been developed gradually and consumer requirements for display devices are increasing, for example, some display devices are required to have a low power consumption.

SUMMARY

An embodiment of the present disclosure provides a pixel circuit, an array substrate, a display device and a method for controlling the same.

In a first aspect, there is provided a pixel circuit including: a pixel display unit consisted of n sub-pixel display units, n≥3; and a data signal control unit coupled to the pixel display unit, n data lines for driving the pixel display unit and a control line. The data signal control unit is configured to, under a condition that a first control signal is input through the control line, couple the n sub-pixel display units to the n data lines for driving the n sub-pixel display units respectively; and under a condition that a second control signal is input through the control line, couple one of the n data lines for driving the pixel display unit to at least one of the n sub-pixel display units in the pixel display unit. The first control signal is one of a high level signal and a low level signal, and the second control signal is the other one of the high level signal and the low level signal.

According to an embodiment, the data signal control unit includes n first switches, each of which is coupled to one of the n sub-pixel display units and one data line, the n first switches are further coupled to the control line and each of the n first switches is configured to switch on to couple the sub-pixel display unit coupled to the first switch to the data line under a condition that the first control signal is input through the control line, and switch off under a condition that the second control signal is input through the control line.

According to an embodiment, the first switch is a first transistor, and the first transistor comprises a gate coupled to the control line, a first electrode coupled to the sub-pixel display unit and a second electrode coupled to the data line.

According to an embodiment, the data signal control unit includes one second switch coupled to one of the sub-pixel display units of the pixel display unit, one of the data lines for driving the pixel display unit and the control line. The second switch is configured to switch on to couple the sub-pixel display unit coupled to the second switch to the data line under a condition that the second control signal is input through the control line, and switch off under a condition that the first control signal is input through the control line.

According to an embodiment, the second switch is a second transistor, and the second transistor comprises a gate coupled to the control line, a first electrode coupled to the one of the sub-pixel display units of the pixel display unit and a second electrode coupled to the one of the data lines for driving the pixel display unit.

According to an embodiment, when the data signal control unit includes the first transistors and the second transistor, the first transistor is an N-type transistor and the second transistor is a P-type transistor; or the first transistor is the P-type transistor and the second transistor is the N-type transistors.

According to an embodiment, the data signal control unit includes n third switches coupled to one of the data lines for driving the pixel display unit. Each of the n third switches is coupled to one of the sub-pixel display units of the pixel display unit and the control line, and is configured to switch on to couple the data line coupled to the third switch to the sub-pixel display unit under a condition that the second control signal is input through the control line, and switch off under a condition that the first control signal is input through the control line.

According to an embodiment, wherein the third switch is a third transistor, and the third transistor comprises a gate coupled to the control line, a first electrode coupled to the one of the sub-pixel display units of the pixel display unit and a second electrode coupled to the one of the data lines for driving the pixel display unit.

According to an embodiment, when the data signal control unit includes the first transistors and the third transistors, the first transistor is an N-type transistor and the third transistor is a P-type transistor; or the first transistor is the P-type transistor and the third transistor is the N-type transistor.

In a second aspect, there is provided an array substrate, including a plurality of data lines and a plurality of gate lines and a plurality of sub-pixel regions that are defined by the plurality of data lines and the plurality of gate lines which cross each other in an insulated manner. One pixel region is consisted of n sub-pixel regions, and the array substrate further includes a plurality of control lines crossing the plurality of data lines, each of pixel regions is disposed to the pixel circuit described above and each row of the pixel regions arranged along a direction of the gate line is coupled to one of the control lines.

According to an embodiment, the pixel display unit includes a first sub-pixel display unit, a second sub-pixel display unit and a third sub-pixel display unit. When the data signal control unit includes the second switch, the second switches within three adjacent pixel regions along the direction of the gate line are coupled to different sub-pixel display units.

In a third aspect, there is provided a display device, including the array substrate described above.

According an embodiment, the display device further includes a viewpoint tracking circuit and a control circuit. The viewpoint tracking circuit is configured to acquire a viewpoint position on the display device; and the control circuit is configured to input a first control signal to a first control line, such that n sub-pixel display units at the viewpoint position are coupled to n data lines for driving the n sub-pixel display units respectively, wherein the first control line is a control line that is coupled to a pixel circuit at the viewpoint position; and to input a second control signal to a second control line, such that one of n data lines for driving the pixel display unit is coupled to at least one of the sub-pixel display units of the pixel display unit, wherein the second control line is a control line other than the first control line. The first control signal is one of a high level signal and a low level signal, and the second control signal is the other one of the high level signal and the low level signal.

In a fourth aspect, there is provided a method for controlling the display device described above, including: acquiring a viewpoint position on the display device; and inputting a first control signal to a first control line, such that n sub-pixel display units at the viewpoint position are coupled to n data lines for driving the n sub-pixel display units respectively, wherein the first control line is a control line that is coupled to a pixel circuit at the viewpoint position; and inputting a second control signal to a second control line, such that one of the n data lines for driving the pixel display unit is coupled to at least one of sub-pixel display units of the pixel display unit, wherein the second control line is a control line other than the first control line. The first control signal is one of a high level signal and a low level signal, and the second control signal is the other one of the high level signal and the low level signal.

BRIEF DESCRIPTION OF THE DRAWINGS

In order to clarify the technical solutions in the present disclosure, a brief description will be given to the drawings used for illustrating the embodiments. It is obvious that the following drawings are merely a part of exemplary embodiments of the present disclosure and other drawings can be made by those skilled in the art without paying creative labor.

REFERENCE NUMERALS

01—pixel region; 10—pixel display unit; 101—sub-pixel display unit; 20—data signal control unit; 201—first switch; 202—second switch; 203—third switch.

DETAILED DESCRIPTION

The clear and complete description will be given to the technical solution of the present disclosure in connection with the drawings in embodiments of the present disclosure. It is obvious that the described embodiments are merely a part of the embodiments of the present disclosure, but not all of embodiments of the present disclosure. In view of the disclosed embodiments, other embodiments obtained by those skilled in the art without paying creative labor are within the scope of the present disclosure.

Figure 1:
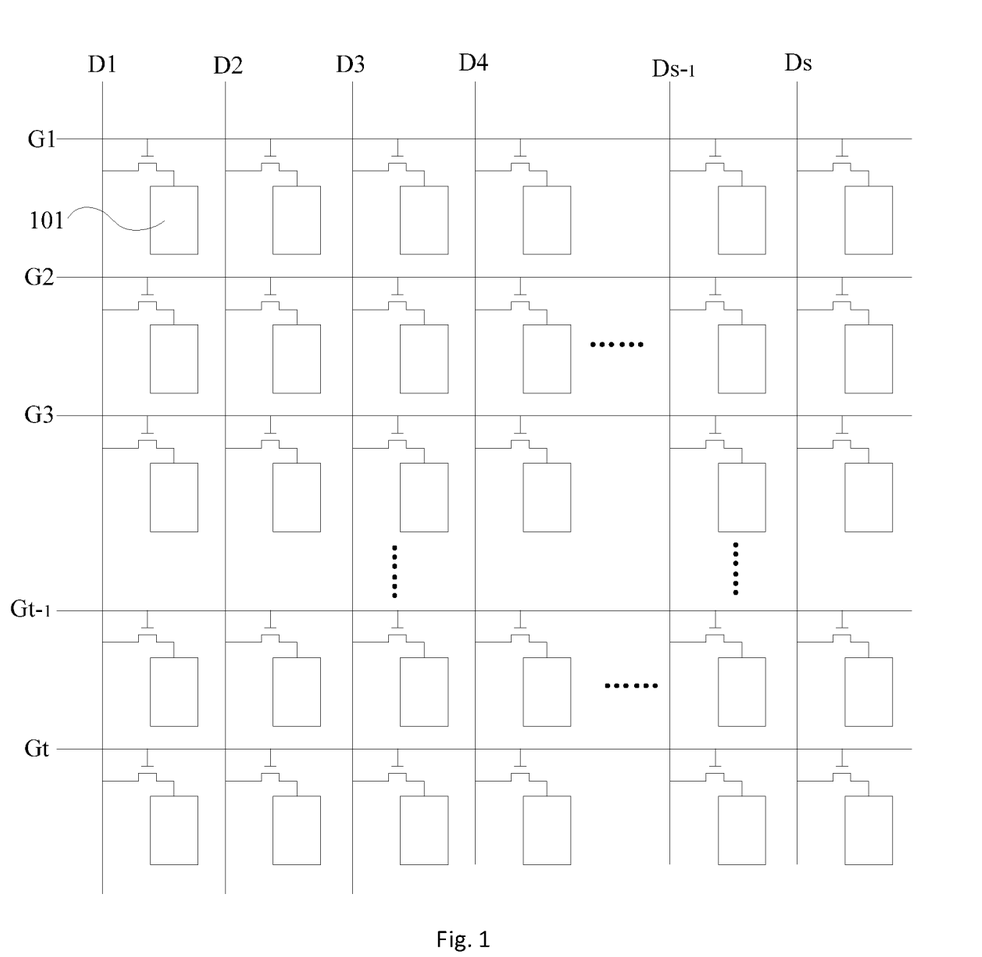
FIG. 1 is a schematic diagram illustrating a structure of an array substrate.

As shown in FIG. 1, generally the array substrate in the display device includes a plurality of gate lines (G1, G2, G3 . . . Gt-1, Gt), a plurality of data lines (D1, D2, D3 . . . Ds-1, Ds) and a plurality of sub-pixel regions that are defined by the plurality of gate lines and the plurality of data lines. Each of sub-pixel regions includes one sub-pixel display unit 101 and n sub-pixel regions constitute one pixel region 01, where n≥3. Each pixel region 01 includes n sub-pixel display units 101. When displaying, the gate lines are scanned row by row, and when a certain gate line is scanned, the signals over the data lines are input to a plurality of sub-pixel display units 101 coupled to the scanned gate line. However, when a certain gate line is scanned, the signal over each data line may merely be input to one sub-pixel display unit 101, thereby resulting in that the display device has a high power consumption.

Figure 2:
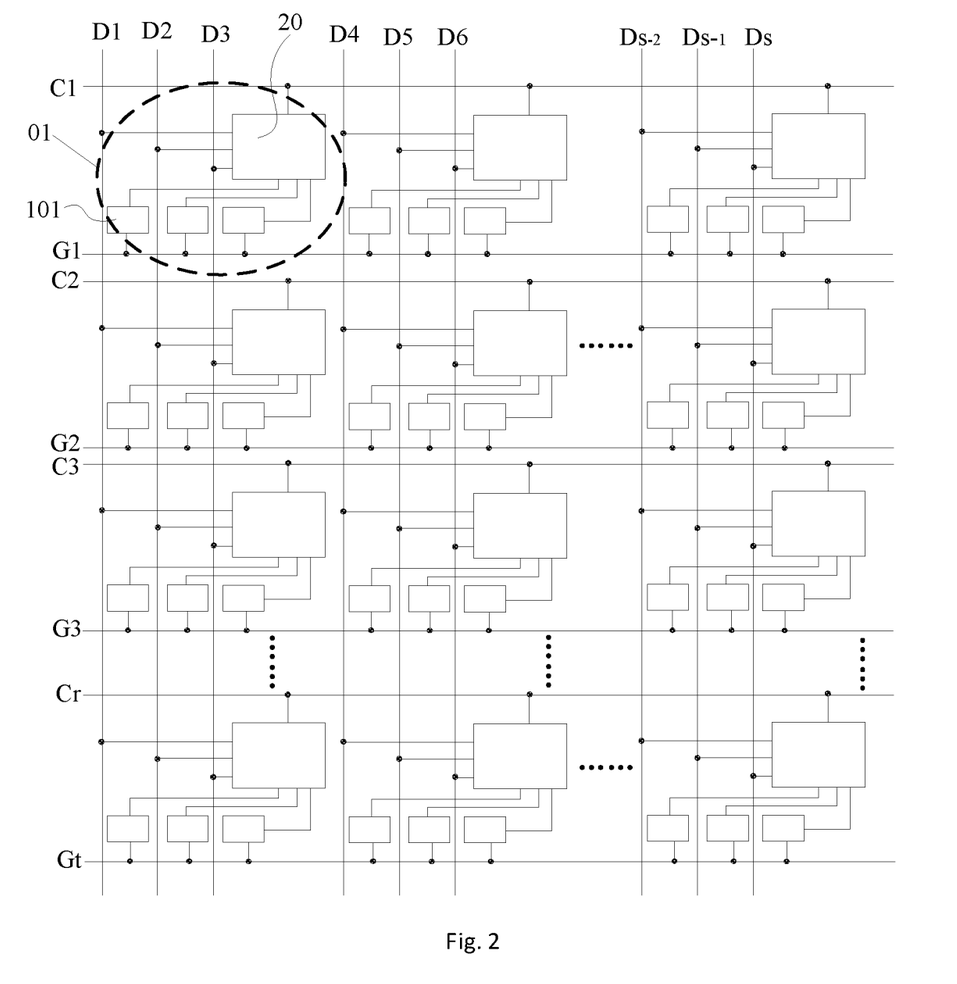
FIG. 2 is a schematic diagram illustrating a structure of an array substrate according to an embodiment of the present disclosure.

An embodiment of the present disclosure provides an array substrate, as shown in FIG. 2, including a plurality of data lines ($D_1$, $D_2$, $D_3$ . . . $D_{s-1}$, $D_s$), a plurality of gate lines ($G_1$, $G_2$, $G_3$ . . . $G_{t-1}$, $G_t$) and a plurality of sub-pixel regions that are defined by the plurality of gate lines and the plurality of data lines. N sub-pixel regions constitute one pixel region 01, where n≥3. Each pixel region 01 is disposed with a pixel circuit. The array substrate further includes a plurality of control lines (C1, C2, C3 . . . $C_{r-1}$, $C_r$) crossing the plurality of data lines and each row of the pixel regions arranged along a direction of the gate line is coupled to one of the control lines. The control line may be disposed in parallel to the gate lines. Here, the pixel region 01 refers to a region where a pixel display unit 10 is located.

The pixel circuit will be described in detail by taking the pixel circuit disposed within one pixel region 01 as an example.

The embodiments of the present disclosure provide a pixel circuit, as shown in FIGS. 2-6, including a pixel display unit 10 consisted of n sub-pixel display unit 101, where n≥3. The pixel circuit further includes a data signal control unit 20 coupled to the pixel display unit 10, n data lines for driving the pixel display unit 10 and a control line. The data signal control unit 20 couples the n sub-pixel display unit 101 to the n data lines for driving the n sub-pixel display unit 101 respectively under a condition that a first control signal is input through the control line, and couples one of the n data lines for driving the n sub-pixel display unit 10 to at least one of the sub-pixel display units 101 of the pixel display unit 10 under a condition that a second control signal is input through the control line inputs. The first control signal is one of a high level signal and a low level signal, and the second control signal is the other one of the high level signal and the low level signal. The high level signal has a voltage higher than that of the low level signal. In a positive logical circuit, the high level signal may be indicated as a logical value 1, and the low level signal may be indicated as a logical value 0.

It is noted that, firstly, the first control signal may be a high level signal and the second control signal may be a low level signal, or the first control signal may be a low level signal and the second control signal may be a high level signal, so long as it can be ensured that the n sub-pixel display units 101 may be coupled to the n data lines for driving the n sub-pixel display units 101 respectively under a condition that the first control signal is input through the control line, and one of the n data lines for driving the pixel display unit 10 may be coupled to at least one of the sub-pixel display unit 101 of the pixel display unit 10 under a condition that the second signal is input through the control line.

Secondly, one pixel display unit 10 includes n sub-pixel display unit 101, where n≥3. When n=3, one pixel display unit 10 may include a red sub-pixel display unit, a green sub-pixel display unit and a blue sub-pixel display unit.

When the pixel display unit 10 includes n sub-pixel display unit 101, the pixel circuit shall include n data lines such that under a condition that the first control signal is input through the control line, the n sub-pixel display unit 101 may be coupled to the n data lines respectively.

In view of the above, under a condition that the second control signal is input through the control line, any one of the n data lines for driving the pixel display unit 10 may be coupled to one or more the sub-pixel display unit 101 in the pixel display unit 10.

As an example, the pixel display unit 10 includes three sub-pixel display units 101, and in this case, there are three data lines to drive the pixel display unit 10. Under a condition that the second control signal is input through the control line, one of the three data lines may be coupled to one, two or all of the three sub-pixel display units 101.

Thirdly, since the pixel circuit of the present disclosure further includes the data signal control unit 20, the control line and a plurality of lines coupled to the data signal control unit 20 on the basis of the existing pixel circuit, there are many connection lines in the pixel circuit of the embodiment of the present disclosure. With the C-MOS process employed on a silicon substrate, not only an active addressing matrix of a display panel pixel but also a driving control circuit on a silicon chip with multiple functions such as Static Random Access Memory (SRAM), Timer Control Register (T-CON) and the like may be manufactured, which greatly decreases the number of the connection lines, increases reliability and realize a light-weighted integration and a lower cost, thereby the pixel circuit of the present disclosure is preferably achieved with silicon-based process.

Fourthly, it is not intended to limit the type of the sub-pixel display unit 101, and the sub-pixel display unit 101 may be a sub-pixel display unit 101 in a Liquid Crystal Display (LCD) or a sub-pixel display unit 101 in an Organic Light-Emitting Diode (OLED).

An embodiment of the present disclosure provides a pixel circuit including a data signal control unit 20, and under a condition that a first control signal is input through a control line, the data signal control unit 20 may couple n sub-pixel display units 101 to n data lines for driving the n sub-pixel display units respectively. At this time, the signal over one data line may be transmitted to one sub-pixel display unit and thus each of the sub-pixel display units may display normally. Under a condition that a second control signal is input through the control line, the data signal control unit 20 may further couple one of n data lines for driving the pixel display unit 10 to at least one of the sub-pixel display units 101 of the pixel display unit 10. At this time, since only one of n data lines for driving the pixel display unit 10 is coupled to at least one of sub-pixel display units 101 of the pixel display unit 10 and other data lines are not coupled to the sub-pixel display units 101, the signals over the other data lines cannot be transmitted to the sub-pixel display units 101. Therefore, when the pixel circuit is applied to a display device and the second control signal is input through the control line, the power consumption of the display device can be decreased.

Figure 3:
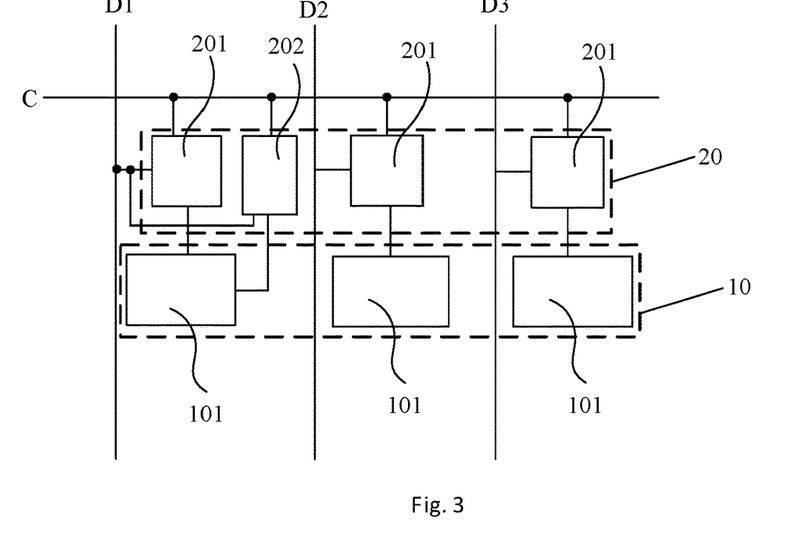
FIG. 3 is a schematic diagram illustrating a structure of a pixel circuit according to an embodiment of the present disclosure.
Figure 5:
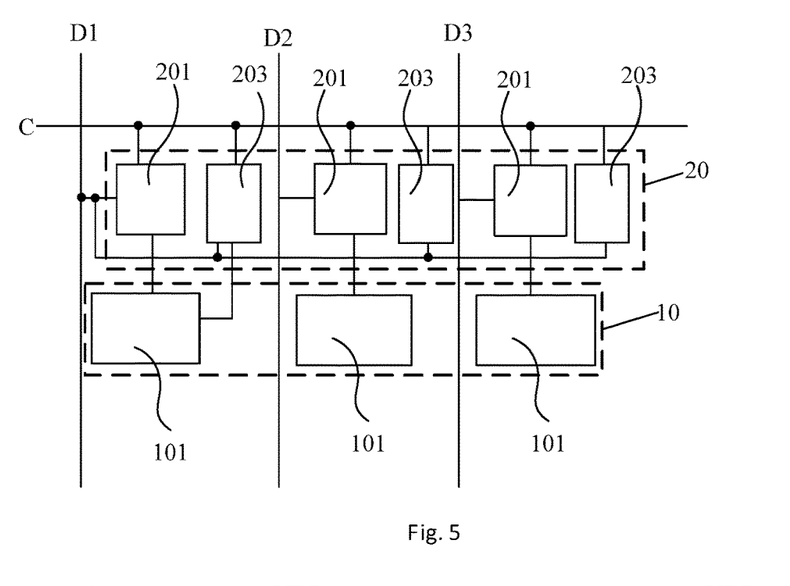
FIG. 5 is a schematic diagram illustrating a structure of a pixel circuit according to another embodiment of the present disclosure.

According to an embodiment, as shown in FIGS. 3 and 5, the data signal control unit 20 may include n first switches 201, each of which is coupled to one of the sub-pixel display units 101 and one data line. The n first switches 201 are further coupled to the control line and each of the first switches 201 is switched on to couple the sub-pixel display units 101 coupled to the first switch 201 to the data line under a condition that the first control signal is input through the control line, and switched off under a condition that the second control signal is input through the control line.

There is no limitation to the type of the first switches 201 and the first switches 201 may be example for transistors.

Here, under a condition that the first control signal is input through the control line, because the first switch 201 is turned on, the signal over the data line may be transmitted to the sub-pixel display unit 101 through the first switch 201; and under a condition that the second control signal is input through the control line, because the first switch 201 is turned off, the signal over the data line may not be transmitted to the sub-pixel display unit 101 through the first switch 201 at this time.

In the embodiment of the present disclosure, since the data signal control unit 20 includes the n first switches 201, the n sub-pixel display units 101 may be coupled to n data lines through the n first switches 201 respectively under a condition that the first control signal is input through the control line, such that the signal over one data line may be transmitted to one sub-pixel display unit 101.

Figure 4:
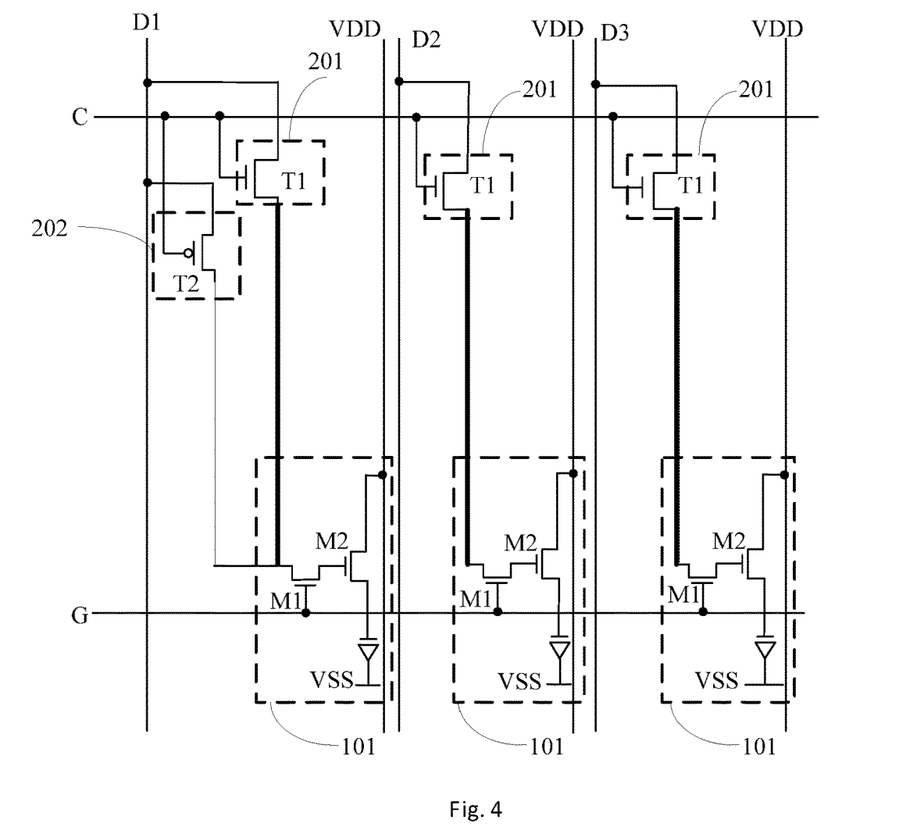
FIG. 4 is a schematic diagram illustrating a specific structure of a pixel circuit according to an embodiment of the present disclosure.
Figure 6:
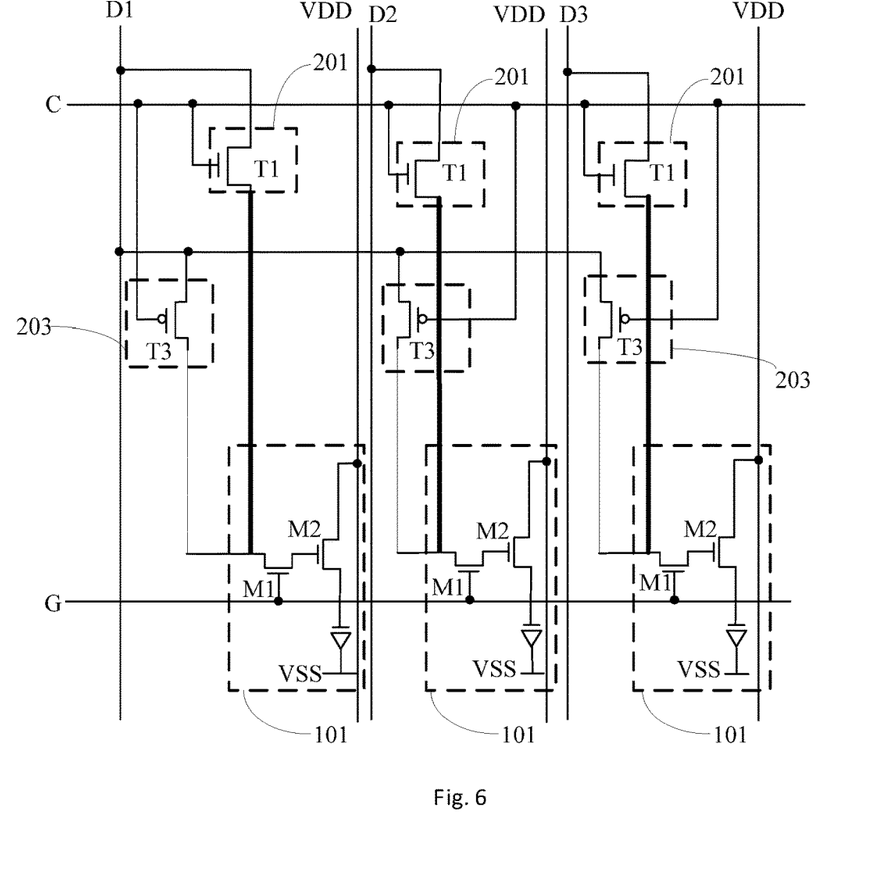
FIG. 6 is a schematic diagram illustrating a specific structure of a pixel circuit according to another embodiment of the present disclosure.

Specifically, as shown in FIGS. 4 and 6, the first switch 201 may be a first transistor T1, and the gate of the first transistor T1 is coupled to the control line, the first electrode of the first transistor T1 is coupled to the sub-pixel display unit 101 and the second electrode of the first transistor T1 is coupled to the data line.

There is no limitation to the type of the first transistor T1 and the first transistor T1 may be an N-type transistor or a P-type transistor. When the first transistor T1 is the N-type transistor, if the first control signal is a high level signal, the first transistor T1 is turned on. At this time, the signal over the data line may be transmitted to the sub-pixel display unit 101 through the first transistor T1. When the first transistor T1 is the P-type transistor, if the first control signal is a low level signal, the first transistor T1 is turned on. At this time, the signal over the data line may be transmitted to the sub-pixel display unit 101 through the first transistor T1.

It is noted that the transistors in the embodiment of the present disclosure may be thin film transistors, field effect transistors or other types of transistors. In view of this, the first and second electrodes of the first transistor are not intended to be limited. For example, the first electrode may be a source electrode and the second electrode may be a drain electrode; or the first electrode may be the drain electrode and the second electrode may be the source electrode.

Here, as shown in FIGS. 4 and 6, taking a sub-pixel display unit 101 in an OLED as an example, the sub-pixel display unit 101 includes a first transistor M1, a driving transistor M2 and a light-emitting element. A gate of the first transistor M1 is coupled to a gate line, a first electrode is coupled to the data signal control unit 20 and a second electrode is coupled to a gate of the driving transistor M2.

A first electrode of the driving transistor M2 is coupled to a first voltage terminal VDD, and a second electrode is coupled to an anode of the light-emitting element. A cathode of the light-emitting element is coupled to a second voltage terminal VSS. The sub-pixel display unit 101 may further include a storage capacitor, one end of the storage capacitor is coupled to the gate of driving transistor M2 and the other end is coupled to the first voltage terminal VDD. The storage capacitor is not shown in the drawings of the present disclosure. In addition, the light-emitting element may an Organic Light-Emitting Diode or other type of element capable of emitting light. The second voltage terminal VSS may be a low voltage terminal or a ground terminal.

According to an embodiment, as shown in FIG. 3, the data signal control unit 20 may include one second switch 202 coupled to one of the sub-pixel display units 101 of the pixel display unit 10, one of the data lines for driving the pixel display unit 10 and the control line. The second switch 202 is switched on to couple the sub-pixel display unit 101 coupled to the second switch 202 to the data line under a condition that the second control signal is input through the control line, and switched off under a condition that the first control signal is input through the control line.

The second switch 202 may be coupled to any one of data lines for driving the pixel display unit 10 and any one of sub-pixel display units 101 of the pixel display unit 10.

Here, there is no limitation to the type of the second switch 202, and the second switch 202 may be a transistor, the type of which is different from that of the first transistor T1.

In an embodiment of the present disclosure, under a condition that the second control signal is input through the control line, since the first switches 201 are turned off, the signals over the data lines can not be transmitted to the sub-pixel display unit 101 through the first switches 201. In this case, because the second switch 202 is turned on, the signal over one of data lines for driving the pixel display unit 10 may be transmitted to one sub-pixel display unit 101 through the second switch 202. Other data lines are not coupled to the sub-pixel display units 101, therefore, the signals over other data lines cannot be transmitted to the sub-pixel display units 101.

Specifically, as shown in FIG. 4, the second switch 202 is a second transistor T2, and a gate of the second transistor T2 is coupled to the control line, a first electrode of the second transistor T2 is coupled to one of the sub-pixel display units 101 of the pixel display unit 10 and a second electrode of the second transistor T2 is coupled to one of the data lines for driving the pixel display unit 10.

Here, when the data signal control unit 20 includes the first switches 201 being the first transistors T1, if the first transistor T1 is an N-type transistor, the second transistor T2 is a P-type transistor, and at this time, the first control signal is a high level signal and the second control signal is a low level signal. Under a condition that the high level signal is input through the control line, the first transistor T1 is turned on and the second transistor T2 is turned off, thus the signals over the n data lines for driving the pixel display unit 10 may be transmitted to n sub-pixel display units 101 respectively (as illustrated with bold lines in FIGS. 4 and 6). Under a condition that the low level signal is input through the control line, the first transistors T1 are turned off and the second transistor T2 is turned on, and thus only the signal over one of data lines for driving the pixel display unit 10 may be transmitted to one of the sub-pixel display units 101. If the first transistor is the P-type transistor and the second transistor is the N-type transistor, the first control signal is a low level signal and the second control signal is a high level signal. The operating of the pixel circuit is similar to the above under a condition that the high level signal or the low level signal is input through the control line and the repeated description will be omitted. In the embodiment shown in FIG. 4, the illustration is shown by the example of which the first transistors T1 are N-type transistors and the second transistor is a P-type transistor.

According to an embodiment, as shown in FIG. 5, the data signal control unit 20 includes n third switches 203 coupled to one of the data lines for driving the pixel display unit 10. Each of the third switches 203 is coupled to one of the sub-pixel display units 101 of the pixel display unit 10 and the control line, and is switched on to couple the data line coupled to the third switch 203 to the sub-pixel display unit 101 under a condition that the second control signal is input through the control line, and switched off under a condition that the first control signal is input through the control line.

When the pixel display unit 10 includes n sub-pixel display units 101, there are n data lines to drive the pixel display unit 10 and the n third switches 203 may be coupled to any one of the n data lines.

Here, there is no limitation to the type of the third switches 203 and the third switches 203 may be transistors, the type of which is different from that of the first transistors T1.

In an embodiment of the present disclosure, under a condition that the second control signal is input through the control line, since the first switches 201 are turned off, the signals over the data lines cannot be transmitted to the sub-pixel display units 101 through the first switches 201. In this case, because the third switches 203 are turned on, the signal over one of data lines for driving the pixel display unit 10 may be transmitted to n sub-pixel display units 101 through the n third switch 203 respectively. Since other data lines are not coupled to the sub-pixel display units 101, the signals over other data lines cannot be transmitted to the sub-pixel display units 101.

Specifically, as shown in FIG. 6, the third switches 203 are third transistors T3, and a gate of the third transistor T3 is coupled to the control line, a first electrode of the third transistor T3 is coupled to one of the sub-pixel display units 101 of the pixel display unit 10 and a second electrode of the third transistor T3 is coupled to one of the data lines for driving the pixel display unit 10.

Here, when the data signal control unit 20 includes the first switches 201 and the first switches 201 are the first transistors T1, if the first transistors are N-type transistors, the third transistors T3 are P-type transistors, and at this time, the first control signal is a high level signal and the second control signal is a low level signal. Under a condition that the high level signal is input through the control line, the first transistors T1 are turned on and the third transistors T3 are turned off, thus the signals over the n data lines for driving the pixel display unit 10 may be transmitted to the n sub-pixel display units 101 respectively. Under a condition that the low level signal is input through the control line, the first transistors T1 are turned off and the third transistor T3 are turned on, and thus only the signal over one of data lines for driving the pixel display unit 10 may be transmitted to the n sub-pixel display units 101 through the n third transistors T3 respectively. If the first transistors T1 are P-type transistors and the third transistors T3 are N-type transistors, the first control signal is a low level signal and the second control signal is a high level signal. The operating of the pixel circuit is similar to the above under a condition that the high level signal or the low level signal is input through the control line and the repeated description will be omitted. In the embodiment shown in FIG. 6, the illustration is shown by the example of which the first transistors T1 are N-type transistors and the third transistors T3 are P-type transistors.

An embodiment of the present disclosure provides an array substrate, as shown in FIG. 2, the above pixel circuit is disposed within each pixel region 01 and each row of the pixel circuits arranged along a direction of the gate line is coupled to one of the control lines. The pixel display unit 10 includes a first sub-pixel display unit, a second sub-pixel display unit and a third sub-pixel display unit. When the data signal control unit 20 includes the second switch 202, the second switches 202 within three adjacent pixel regions 01 along the direction of the gate line are coupled to different sub-pixel display units 101 respectively.

Each pixel region 01 is disposed with one pixel display unit 10. Here, as an example, in the three adjacent pixel regions 01, the second switch 202 in the first pixel region is coupled to the first sub-pixel display unit, the second switch 202 in the second pixel region is coupled to the second sub-pixel display unit and the second switch 202 in the third pixel region is coupled to the third sub-pixel display unit.

In the embodiment of the present disclosure, since the second switches 202 in the three adjacent pixel regions 01 are coupled to the different sub-pixel display units 101 respectively, under a condition that the second control signal is input through the control line, the second switches 202 are turned on and thus the second switches 202 in the three adjacent pixel regions 01 are coupled to the different sub-pixel display units 101 respectively. In this case, a pixel display unit 10 may be formed from these three different sub-pixel display units 101. Thus, under a condition that the second control signal is input through the control lines, a plurality of pixel display units 10 may be reformed on the array substrate. For example, the array substrate includes 129 pixel display units 10, and under a condition that the second control signal is input through the control lines, the number of the pixel display units 10 on the array substrate which are used for displaying is changed into 43. Since the number of the sub-pixel display units 101 on the array substrate which are used for displaying under a condition that the second control signal is input through the control lines is one third of that in the case under a condition that the first control signal is input through the control lines, under a condition that the second control signal is input through the control lines, the resolution of the array substrate is decreased and at the same time the power consumption of the array substrate is reduced.

An embodiment of the present disclosure provides a display device including the above array substrate, a viewpoint tracking circuit and a control circuit. The viewpoint tracking circuit acquires a viewpoint position on the display device. The control circuit inputs a first control signal to a first control line, such that n sub-pixel display units 101 at the viewpoint position are coupled to n data lines for driving the n sub-pixel display units 101 respectively. The first control line is a control line that is coupled to a pixel circuit at the viewpoint position. The control circuit inputs a second control signal to a second control line, such that one of n data lines for driving the pixel display unit 10 is coupled to at least one of sub-pixel display units 101 of the pixel display unit 10. The second control line is a control line other than the first control line. The first control signal is one of a high level signal and a low level signal, and the second control signal is the other one of the high level signal and the low level signal It is noted that the display device includes the array substrate, and each row of the pixel circuits arranged along a direction of the gate line on the array substrate is coupled to one of the control lines, thus under a condition that the first control signal is transmitted to the control line coupled to the pixel circuit at the viewpoint position, n sub-pixel display units 101 in each of the pixel display unit 10 at the viewpoint position and the pixel display units 10 that are disposed in the same row as the viewpoint position are coupled to n data lines respectively.

The display device provided by the embodiment of the present disclosure may be any device that displays moving images (such as video) or motionless images (such as stationary images) or displays words or pictures. To be more specific, it is expected that the embodiments can be implemented in multiple electronic devices or can be associated with multiple electronic devices, and the multiple electronic devices may include but not limit to for example a mobile phone, a wireless device, a personal digital assistant (PDA), a handheld or portable computer, GPS receiver/navigator, a camera, a MP3 player, a video camera, a game console, a watch, a clock, a calculator, a television monitor, a flat panel display, a computer monitor, a vehicle display (such as a odometer display and the like), a navigating instrument, a cockpit controller and/or display, a display of a camera video (such as a display of a backward viewing camera of vehicle), an electronic picture, an electronic billboard or signboard, a projector, a building structure, a package, an aesthetic structure (such as a display for an image of a jewelry) and the like. In addition, the electronic devices may be a display component such as an organic light-emitting diode display panel and the like.

In the display device provided in the embodiment of the present disclosure, since the display device includes the viewpoint tracking circuit and the control circuit, after the viewpoint position on the display device is acquired by the viewpoint tracking circuit, the control circuit may input the first control signal to the control line coupled to the pixel circuit at the viewpoint position, such that n sub-pixel display units 101 at the viewpoint position are coupled to n data lines for driving the n sub-pixel display units respectively and thus a displaying with high resolution is achieved at the viewpoint position. The second signal is input through other control lines, such that one of the n data lines for driving the pixel display unit 10 is coupled to at least one of the sub-pixel display units 101 in the pixel display unit 10, thereby reducing the power consumption of the display device.

In view of the above, when the data signal control unit 20 include the second switch 202, the second switches 202 in three adjacent pixel regions 01 along a direction of the gate line are coupled to the different sub-pixel display units 101, such that under a condition that the second control signal is input through the control lines, the number of the sub-pixel display units 101 in the display device which are used for displaying is one third of that in the case under a condition that the first control signal is input through the control lines and thus the resolution of the display device is reduced. A displaying with high resolution at the row where the viewpoint is located and a displaying with low resolution at other positions in the display device may be achieved by inputting the first control signal to the control line being coupled to the pixel circuit at the viewpoint position and inputting the second control signal to the other control lines. In this case, in a way that the resolution may be adjusted, the power consumption of the display device is reduced and at the same time, the display effect at the viewpoint position may be optimal.

Figure 7:
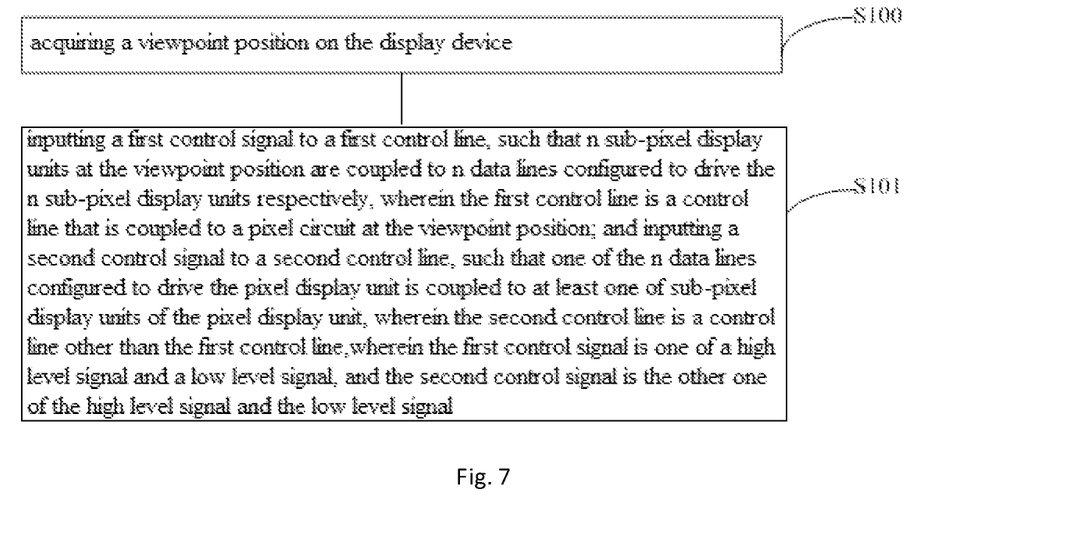
FIG. 7 is a flow chart illustrating a method for controlling a display device according to an embodiment of the present disclosure.

An embodiment of the present disclosure provides a method for controlling the above display device, as shown in FIG. 7, including the following steps.

In step S100, a viewpoint position on the display device is acquired.

Here, there is no limitation to how to acquire the viewpoint position on the display device, and the existing technology for acquiring the viewpoint position can be used to acquire the viewpoint position.

In step S101, a first control signal is input to a first control line, such that n sub-pixel display units 101 at the viewpoint position are coupled to n data lines for driving the n sub-pixel display units 101 respectively, wherein the first control line is a control line that is coupled to a pixel circuit at the viewpoint position. A second control signal is input to a second control line, such that one of the n data lines for driving the pixel display unit 10 is coupled to at least one of sub-pixel display units 101 of the pixel display unit 10, wherein the second control line is a control line other than the first control line. The first control signal is one of a high level signal and a low level signal, and the second control signal is the other one of the high level signal and the low level signal.

In the method for controlling the display device provided by the embodiment of the present disclosure, after the viewpoint position on the display device is acquired, the first control signal may be input to the control line coupled to the pixel circuit at the viewpoint position, such that n sub-pixel display units 101 at the viewpoint position are coupled to n data lines for driving the n sub-pixel display units 101 respectively and thus a displaying with high resolution may be achieved normally. The second signal is input through other control lines, such that one of the n data lines for driving the pixel display unit 10 is coupled to at least one of the sub-pixel display units 101 in the pixel display unit 10, thereby reducing the power consumption of the display device.

It is appreciated for those skilled in the art that some or all of steps that implement the above embodiments can be achieved by hardware associated with program instruction. The above program instruction can be stored in a readable storage medium of a computer and when executed, the steps including the embodiments of the above described method can be performed. The storage medium may include various medium that can store program code, such as ROM, RAM, disc, optical disk or the like.

The above embodiments are the specific embodiments of the present disclosure and the scope of the present disclosure is not intended to be limited thereto. Modifications and changes can be readily made for those skilled in the art within the technical scope of the present disclosure and they shall be included in the scope of the present disclosure. Therefore, the scope protected by the present disclosure should be defined by the appended claims.

What is claimed is:

1. An array substrate, comprising a plurality of data lines and a plurality of gate lines and a plurality of sub-pixel regions that are defined by the plurality of data lines and the plurality of gate lines which cross each other in an insulated manner, wherein one pixel region is consisted of n sub-pixel regions, and the array substrate further comprises a plurality of control lines crossing the plurality of data lines, each of pixel regions is disposed with a pixel circuit and each row of the pixel regions arranged along a direction of the gate line is coupled to one of the control lines, wherein the pixel circuit comprises:

a pixel display unit, comprising n sub-pixel display units, wherein n≥3; and a data signal control unit, coupled to the pixel display unit, n data lines, and a control line, wherein the n data lines drive the pixel display unit, wherein the data signal control unit is configured to, under a condition that a first control signal is input through the control line, couple the n sub-pixel display units to the n data lines to drive the n sub-pixel display units respectively; and under a condition that a second control signal is input through the control line, couple one of the n data lines to one part of the n sub-pixel display units in the pixel display unit so that the one part of the n sub-pixel display units rather than the other part of the n sub-pixel display units are driven to display, wherein the first control signal is one of a high level signal and a low level signal, and the second control signal is the other one of the high level signal and the low level signal;

wherein the data signal control unit comprises:

n first switches, each coupled to one of the n sub-pixel display units and one of the data lines, the n first switches are further coupled with the control line, and each of the n first switches is configured to switch on to couple the sub-pixel display unit to the data line when the first control signal is input through the control line, and to switch off when the second control signal is input through the control line, wherein the sub-pixel display is coupled to the first switch;

a second switch coupled to one of the sub-pixel display units of the pixel display unit and one of the data lines, wherein the data lines are configured to drive the pixel display unit, and the second switch is further coupled to the control line;

wherein the second switch is configured to switch on to couple the sub-pixel display unit to the data line under a condition that the second control signal is input through the control line, and to switch off under a condition that the first control signal is input through the control line, wherein the sub-pixel display unit is coupled to the second switch; and wherein the pixel display unit comprises a first sub-pixel display unit, a second sub-pixel display unit and a third sub-pixel display unit and the second switches within three adjacent pixel regions along the direction of the gate line are coupled to different sub-pixel display units.

2. The array substrate according to claim 1, wherein the first switch is a first transistor, and the first transistor comprises a gate coupled with the control line, a first electrode coupled with the sub-pixel display unit, and a second electrode coupled with the data line.

3. The array substrate according to claim 1, wherein the second switch is a second transistor, and the second transistor comprises a gate coupled to the control line, a first electrode coupled to the one of the sub-pixel display units of the pixel display unit and a second electrode coupled to the one of the data lines, wherein the data lines are configured to drive the pixel display unit.

4. The array substrate according to claim 1, wherein the data signal control unit comprises n third switches coupled to one of the data lines, wherein the data lines are configured to drive the pixel display unit, wherein each of the n third switches is coupled to one of the sub-pixel display units of the pixel display unit and the control line, and each of the n third switches is configured to switch on to couple the data line to the sub-pixel display unit under a condition that the second control signal is input through the control line, and switch off under a condition that the first control signal is input through the control line, wherein the data line is coupled to the third switch.

5. The array substrate according to claim 4, wherein the third switch is a third transistor, and the third transistor comprises a gate coupled to the control line, a first electrode coupled to the one of the sub-pixel display units of the pixel display unit and a second electrode coupled to the one of the data lines, wherein the data lines are configured to drive the pixel display unit.

6. A display device, comprising an array substrate,
wherein the array substrate comprises a plurality of data lines and a plurality of gate lines and a plurality of sub-pixel regions that are defined by the plurality of data lines and the plurality of gate lines which cross each other in an insulated manner,
wherein one pixel region is consisted of n sub-pixel regions, and the array substrate further comprises a plurality of control lines crossing the plurality of data lines, each of pixel regions is disposed with a pixel circuit and each row of the pixel regions arranged along a direction of the gate line is coupled to one of the control lines,
wherein the pixel circuit comprises:
a pixel display unit consisted of n sub-pixel display units, n≥3; and
a data signal control unit coupled to the pixel display unit, n data lines configured to drive the pixel display unit and the control line,
wherein the data signal control unit is configured to, under a condition that a first control signal is input through the control line, couple the n sub-pixel display units to the n data lines to drive the n sub-pixel display units respectively; and under a condition that a second control signal is input through the control line, couple one of the n data lines one part of the n sub-pixel display units in the pixel display unit so that the one part of the n sub-pixel display units rather than the other part of the n sub-pixel display units are driven to display,
wherein the first control signal is one of a high level signal and a low level signal, and the second control signal is the other one of the high level signal and the low level signal
the display device further comprising a viewpoint tracking circuit and a control circuit,
the viewpoint tracking circuit is configured to acquire a viewpoint position on the display device; and
the control circuit is configured to input the first control signal to a first control line, such that n sub-pixel display units at the viewpoint position are coupled to n data lines configured to drive the n sub-pixel display units respectively, wherein the first control line is a control line that is coupled to a pixel circuit at the viewpoint position; and to input the second control signal to a second control line, such that one of n data lines configured to drive the pixel display unit is coupled to at least one of the sub-pixel display units of the pixel display unit, wherein the second control line is a control line other than the first control line.

7. A method for controlling the display device according to claim 6, comprising
acquiring a viewpoint position on the display device; and
inputting a first control signal to a first control line, such that n sub-pixel display units at the viewpoint position are coupled to n data lines configured to drive the n sub-pixel display units respectively, wherein the first control line is a control line that is coupled to a pixel circuit at the viewpoint position; and inputting a second control signal to a second control line, such that one of the n data lines configured to drive the pixel display unit is coupled to at least one of sub-pixel display units of the pixel display unit, wherein the second control line is a control line other than the first control line,
wherein the first control signal is one of a high level signal and a low level signal, and the second control signal is the other one of the high level signal and the low level signal.

* * * * *